(12) United States Patent
Johnson et al.

(10) Patent No.: US 6,930,402 B1
(45) Date of Patent: Aug. 16, 2005

(54) POWER SYSTEM FOR A TELECOMMUNICATION FACILITY

(75) Inventors: Larry Johnson, Overland Park, KS (US); John Billigmeier, Shawnee, KS (US); Julie Lieb, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 131 days.

(21) Appl. No.: 10/439,204

(22) Filed: May 15, 2003

(51) Int. Cl.[7] .............................................. H02P 9/04
(52) U.S. Cl. ..................... 290/1 R; 290/1 A; 290/43; 290/19; 290/53; 290/42; 290/4 R; 290/54; 322/1
(58) Field of Search ................................ 290/1 A, 1 R, 290/43, 19, 53, 42, 4 R, 54; 322/1

(56) References Cited

U.S. PATENT DOCUMENTS

| | | | | |
|---|---|---|---|---|
| 5,737,202 A | * | 4/1998 | Shimamori | 363/65 |
| 5,767,584 A | * | 6/1998 | Gore et al. | 290/1 R |
| 6,452,289 B1 | * | 9/2002 | Lansberry et al. | 307/25 |
| 6,649,289 B2 | * | 11/2003 | Hsu et al. | 429/13 |
| 6,833,631 B2 | * | 12/2004 | Van Breems | 290/42 |
| 6,841,893 B2 | * | 1/2005 | Maiwald et al. | 290/43 |

| | | | |
|---|---|---|---|
| 2001/0009338 A1 | | 7/2001 | Reutere |

FOREIGN PATENT DOCUMENTS

| | | | |
|---|---|---|---|
| EP | 0 595 191 A | | 5/1994 |
| EP | 0718094 A | | 6/1996 |

OTHER PUBLICATIONS

Noboru Asano, "The Future of Our Fuel Cell Total Energy System," NTT Review, Mar. 1994, vol. 6, pp. 47-53.

* cited by examiner

*Primary Examiner*—Darren Schuberg
*Assistant Examiner*—Iraj A. Mohandesi

(57) ABSTRACT

The present invention includes a power system that is designed to provide reliable electrical power to a facility, and specifically to a telecommunications facility. The system includes a number of proton exchange membranes (PEMs) adapted to provide DC power. The system is configured so that the PEMs receive fuel from a header that is supplied by a number of hydrogen generators. Storage tanks are also included to provide hydrogen to the header if the hydrogen generators fail. The hydrogen generators receive electricity initially from an array of photovoltaic panels. If the photovoltaic panels fail then AC power from a commercial utility is provided to the hydrogen generators. Finally, the system includes a number of super capacitors that are operable to maintain power during the time required to change between power sources.

10 Claims, 2 Drawing Sheets

POWER SYSTEM FOR A TELECOMMUNICATION FACILITY

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

In general, this invention relates to a system for providing electrical power. More specifically, this invention is directed to a system particularly adapted to provide reliable electrical power for the operation of a remote telecommunications facility.

Although it may be utilized in numerous applications, this invention is specifically adapted to provide power for the continuous operation of a remote telecommunications facility. With its core technology substantially composed of digital components, the telecommunications industry is heavily dependent on the continued supply of reliable electrical power. The critical nature of the functions performed by remote telecommunications facilities further emphasizes the need for a dependable power supply.

Most telecommunications facilities rely on a commercial power utility for electrical power and employ traditional devices, such as a transformer and switchgear, to safely receive and use the electrical power. To insure the facility's power supply is not interrupted, such as in the case of a blackout or other disturbance in the commercial power system, many telecommunications facilities have a system for providing backup power. Although various designs are used, many backup systems employ a diesel generator and an array of batteries. If power from the commercial utility is lost, the diesel generator takes over to supply power, and the battery array insures that power is maintained during the time it takes to switch from utility-supplied power to generator-supplied power. If the generator also fails, such as due to a mechanical malfunction or to the depletion of its fuel source, then the battery array is able to provide power for an additional period of time.

There are several disadvantages inherent in the current manner in which power is supplied to telecommunications facilities. First, the cost of local electrical utility service has risen dramatically in recent years and, by all accounts, will continue to rise. Thus, the cost of local electrical utility power is a large component of the facility's overall power expenses. Next, as the facility's power demands have increased, the number of batteries required to provide an adequate amount of power for a reasonable period of time has also increased. Clearly, the component cost of the system increases with the greater number of batteries required. In addition, the greater number of batteries required has significantly increased the space required to house the backup system, which has increased the spatial cost of the systems. Finally, it is known that generators suffer from certain reliability problems, such as failing to start when needed because of disuse or failed maintenance. Therefore, the reliability of the backup systems could be improved.

The power system of the present invention overcomes these disadvantages by providing reliable electrical power that is not initially dependent on a commercial electrical utility and that does not employ an array of batteries. The system, therefore, is more cost efficient and requires less space than the present manner of providing power to facilities. The invention employs redundant sources of power, and thus, is uninterruptible. Also, the system employs power-generating components that have less of an impact on the environment than the current manner in which power is supplied. Moreover, the system may be constructed at a manufacturing site and then moved to the facility. Thus, the system of the present invention provides power to a telecommunications facility in a manner that is less expensive, that requires less space, that is movable, and that is environmentally friendly.

SUMMARY OF THE INVENTION

The present invention includes a power system that is designed to provide reliable electrical power to a facility, and specifically to a telecommunications facility. The system includes a number of proton exchange membranes (PEMs) adapted to provide DC power. The system is configured so that the PEMs receive fuel from a header that is supplied by a number of hydrogen generators. Storage tanks are also included to provide hydrogen to the header if the hydrogen generators fail. The hydrogen generators receive electricity initially from an array of photovoltaic panels. If the photovoltaic panels fail then AC power from a commercial utility is provided to the hydrogen generators. Finally, the system includes a number of super capacitors that are operable to maintain power during the time required to change between power sources.

BRIEF DESCRIPTION OF THE DRAWING

The present invention is described in detail below with reference to the attached drawing Figures, wherein.

DETAILED DESCRIPTION OF THE INVENTION

The present invention includes both a system and a method for providing reliable electrical power to a facility, and specifically to a telecommunications facility. The system provides redundant sources of electrical power including a number of hydrogen generator/proton exchange membrane cells and a number of photovoltaic panels. The system also includes a number of capacitors to provide power during the time required to switch between power sources. By employing these components, the system avoids the need for an array of batteries and is more cost efficient than current methods for providing power to telecommunications facilities.

Figure 1:
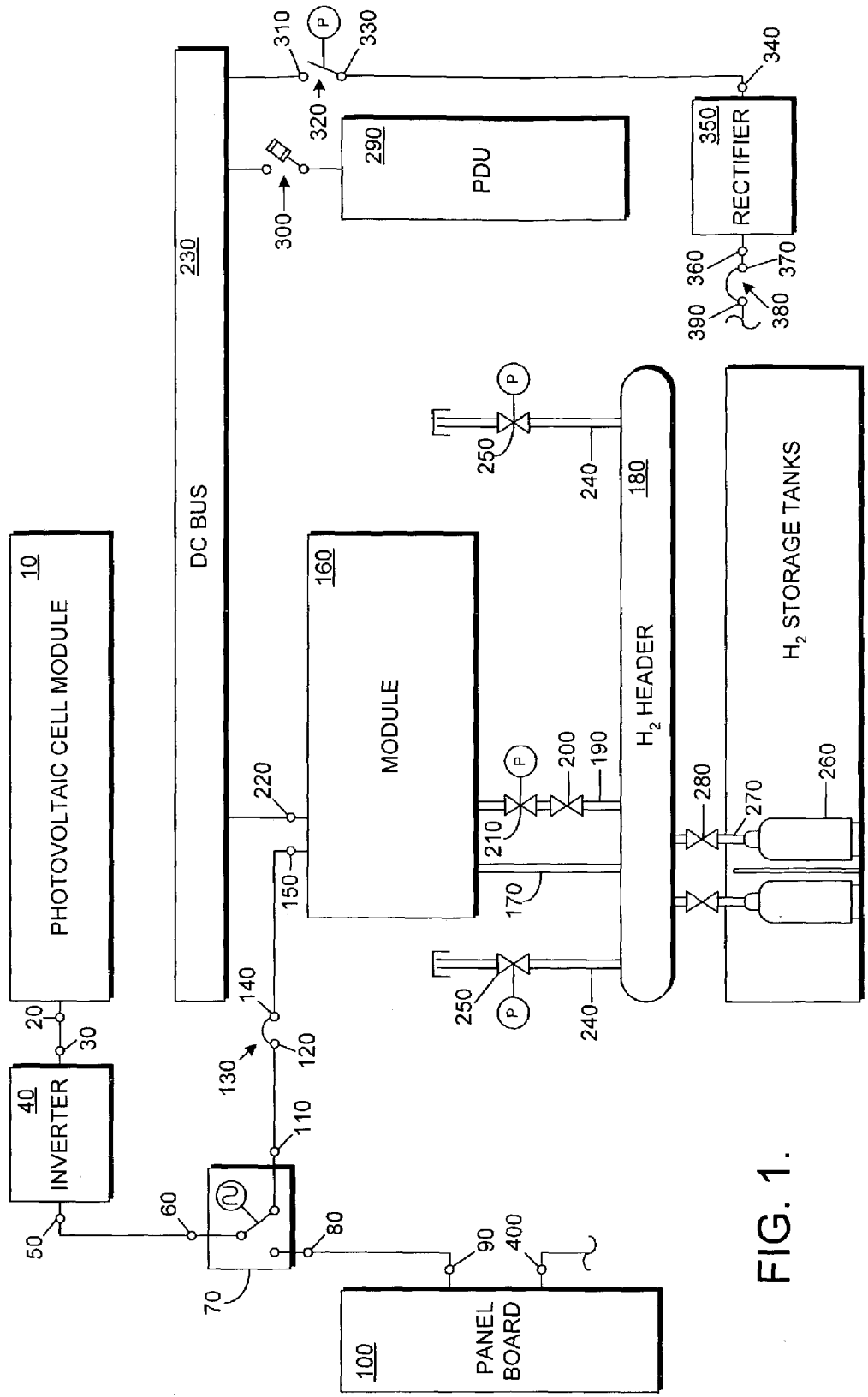
FIG. 1 is a block schematic diagram of the present invention.
Figure 2:
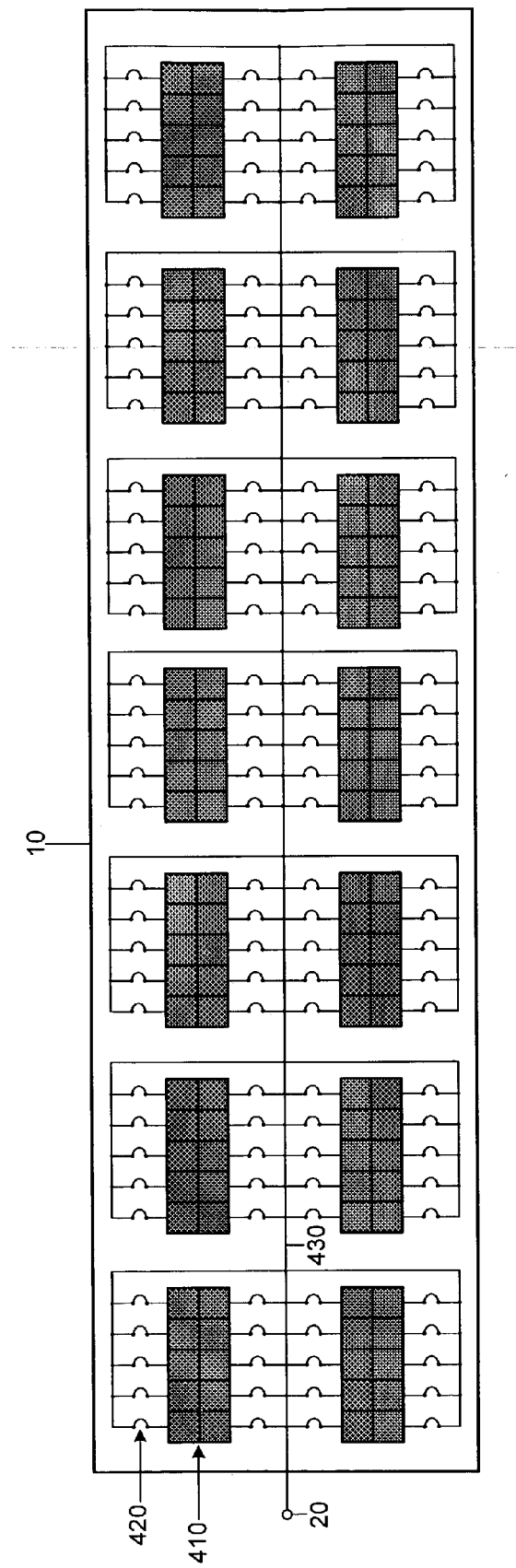
FIG. 2 is a block schematic diagram of the photovoltaic panels array of the present invention.
Figure 3:
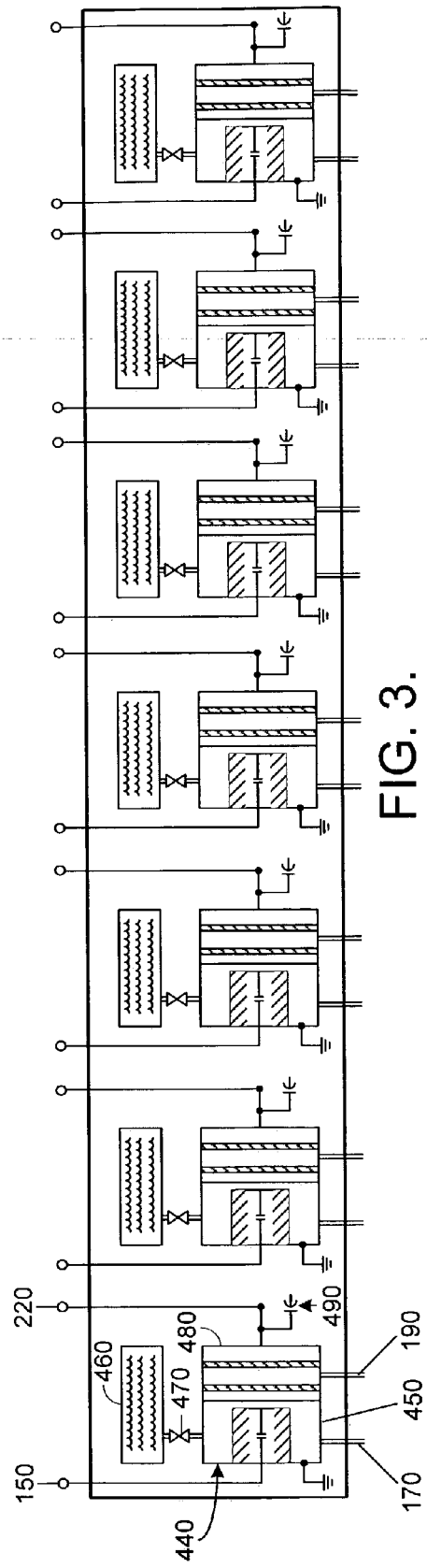
FIG. 3 is a block schematic diagram of the hydrogen generator/proton exchange membrane cells of the present invention.

The present invention is best understood in connection with the schematic diagrams of FIGS. 1–3. In FIG. 1, the power system of the present invention initially comprises a photovoltaic cell module 10. It should be understood a photovoltaic cell is operable to convert light into DC electricity. Therefore, DC electricity is output from module 10 at output 20. In the preferred embodiment, the DC electrical output of module 10 is 43 Vdc. Module 10 will be discussed in more detail below in connection with FIG. 2.

Output 20 of module 10 is coupled to the input 30 of an inverter 40. As is known in the field, an inverter is operable to convert DC electricity into AC electricity. Thus, AC electricity is output from inverter 40 at output 50. In the preferred embodiment, the AC electrical output from inverter 40 is 120 Vac.

Output 50 of inverter 40 is coupled to a first input 60 of a switch 70. It should be understood that for clarity only one switch 70 is shown in FIG. 1 when there are actually a number of switches. Specifically, in the preferred embodiment, the power system contains seven switches 70 and, correspondingly, seven connections from output 50. The second input 80 of switch 70 is coupled to a first output 90 of a panel board 100, while the output 110 of switch 70 is coupled to a first end 120 of a circuit breaker 130. As with switch 70, only one circuit breaker 130 is shown in FIG. 1, when there is actually one circuit breaker for every switch. Thus, in the preferred embodiment of the power system, there are seven circuit breakers 130. Panel board 100 receives electrical power from a commercial electrical utility and contains a number of circuit breakers (not shown). The electrical power from the commercial electrical utility is passed through the circuit breakers to the outputs 90 and 400 of panel board 100.

The position of switch 70 is determined by the output of module 10. So long as the output of module 10 remains above a predetermined level, switch 70 will remain as shown in FIG. 1, that is, switch 70 will provide a short-circuit between output 50 of inverter 40 and circuit breaker 130 and an open circuit to output 90 of panel board 100. However, if the output of module 10 falls below the predetermined level, then switch 70 will provide a short-circuit between output 90 of panel board 100 and circuit breaker 130 and present an open circuit to output 50 of inverter 40.

The second end 140 of circuit breaker 130 is coupled to one input 150 of a module 160. Stated generally, module 160 contains an equal number of hydrogen generator/proton exchange membrane units and super capacitors. A hydrogen generator uses electricity to convert water into hydrogen, and a proton exchange membrane converts hydrogen into electricity. In a hydrogen generator/proton exchange membrane unit, a hydrogen generator and a proton exchange membrane are coupled together in one housing. Module 160 and its components will be discussed in more detail below in connection with FIG. 3.

Input 150 represents one input to the hydrogen generator portion of one hydrogen generator/proton exchange membrane unit. The hydrogen output from the hydrogen generator portion of this unit travels through pipe 170 to $H_2$ header 180. Hydrogen travels from $H_2$ header 180 through pipe 190, which includes two valves, 200 and 210, to the proton exchange membrane portion of the unit. Valve 210 is a pressure-controlled valve that is operable to remain closed unless the pressure within $H_2$ header 180 is above a predetermined level. If the pressure within $H_2$ header 180 falls below a predetermined level, then valve 210 closes. Output 220 represents the output from the proton exchange membrane portion of one hydrogen generator/proton exchange membrane unit. DC electricity is output on output 220, which is coupled to DC bus 230. It should be understood that there is one input 150, one pipe 170, one pipe 190, one valve 200, one valve 210 and one output 220 for each hydrogen generator/proton exchange membrane unit in module 160, although only one of each is shown in FIG. 1. In the preferred embodiment of the power system there are seven hydrogen generator/proton exchange membrane units each with a super capacitor.

Two vent pipes 240 are also coupled to $H_2$ header 180. Each pipe 240 contains a pressure-controlled valve 250. Valve 250 is operable to remain closed unless the pressure within $H_2$ header 180 rises above a predetermined level in which case valve 250 opens and vents the hydrogen stored in header 180 to the atmosphere. If the pressure within $H_2$ header 180 remains below the predetermined level, then valve 210 remains closed.

A number of $H_2$ storage tanks 260 are also coupled to header 180 through an equal number of pipes 270. Each pipe 270 contains a valve 280. Again, for clarity, only two storage tanks 260 are shown in FIG. 1.

Power Distribution Unit (PDU) 290 is coupled to DC bus 230 through fuse 300. Power distribution unit 290 contains connections into the telecommunications facility's power lines, and/or provides connections to the various telecommunications equipment. Power distribution unit 290 may also contain additional circuit breakers or other power switchgear or safety devices and/or circuits, including circuits to limit the voltage or current provided to the facility's power lines, and monitoring/measuring equipment.

A first side 310 of a pressure controlled switch 320 is also coupled to DC bus 230. The second side 330 of switch 320 is coupled to the output 340 of rectifier 350. Switch 330 is operable to provide an open circuit so long as the pressure in header 180 remains above a predetermined level and a short circuit if the pressure in header 180 falls below the predetermined level. As is well known, a rectifier is operable to convert an AC electrical input to a DC electrical output. Thus, DC electricity is present at output 340. The input 360 of rectifier 350 is coupled to a first side 370 of a circuit breaker 380. The second side 390 of circuit breaker 380 is coupled to a second output 400 of panel board 100.

FIG. 2 shows module 10 in greater detail. Module 10 contains a number of photovoltaic cell arrays 410. As stated above, a photovoltaic cell is operable to convert light into DC electricity. One photovoltaic cell array that is suitable for the present invention is the SX series photovoltaic module produced by BP Solar International LLC of Linthicum, Md. As shown in FIG. 2, the preferred embodiment of the power system includes 14 arrays 410. Each array is coupled to a number of circuit breakers 420, and circuit breakers 420 are also coupled to a main bus 430. Main bus 430 terminates at output 20. As stated above, in the preferred embodiment of the power system, the DC electrical output at output 20 is 43 Vdc.

FIG. 3 shows module 160 in greater detail. Module 160 contains a number of hydrogen generator/proton exchange membrane units 440. Input 150 is coupled to the hydrogen generator portion 450 of unit 440. A water recycling storage tank 460 is also coupled to hydrogen generator portion 450 through a valve 470. As stated above, hydrogen generator portion 450 is operable to use electricity received at input 150 with water received from water recycling storage tank 460 to produce hydrogen which is output in pipe 170 to header 180. Hydrogen generator portion 450 is also coupled to ground. Proton exchange membrane (PEM) portion 480 of unit 440 receives hydrogen from header 180 through pipe 190. Proton exchange membrane portion 480 is operable to convert hydrogen to DC electricity, which is output on output 220. One PEM that is suitable for the present invention is the Nexa™ power module manufactured by Ballard Power Systems Inc. of Burnaby, British Columbia, Canada. The output of proton exchange membrane portion 480 is also coupled to a super capacitor 490. As shown in FIG. 3, in the preferred embodiment of the power system, there are seven hydrogen generator/proton exchange membrane units 440 and seven super capacitors 490.

The power system of the present invention may also contain a number of sensing and control mechanisms (not expressly shown) for determining which valves and/or switches to open or close. As is known, the sensing mechanisms may be separate devices or may be integral to the valves, switches and/or devices being monitored. Likewise, the control mechanism may be a separate device, such as a programmable logic controller, or may be part of one of the components already described.

In operation, module 10 produces DC electricity that it passes to inverter 40 for conversion to AC electricity. So long as the output of module 10 is above a predetermined level, switches 70 provide a short circuit between the output of inverter 40 and circuit breakers 130. In this manner, module 10 supplies electrical power through inverter 40 to hydrogen generator portions 450 of units 440 in module 160. If the output of module 10 falls below the predetermined level, then switches 70 provide a short circuit between panel board 100 and circuit breakers 130 so that hydrogen generator portions 450 of units 440 in module 160 receive electrical power from a commercial utility.

Hydrogen generator portions 450 of units 440 in module 160 use the electricity supplied at inputs 150 with water supplied from storage tanks 460 to produce hydrogen that is passed to header 180 through pipes 170. Initially, the hydrogen in header 180 is passed both to storage tanks 260 and to proton exchange membrane portions 480. After storage tanks 260 are filled, however, hydrogen is passed solely to proton exchange membrane portions 480. If the pressure in header 180 falls below a predetermined level, valves 220 close so that the amount of hydrogen in header 180 may be built up. In this situation, switch 320 also close so that PDU 290 receives electrical power from panel board 100 through rectifier 350. Storage tanks 260 alone will provide hydrogen to proton exchange membrane portions 480 for some time if hydrogen generator portions 450 stop operation.

So long as proton exchange membrane portions 480 receive hydrogen they will produce DC electricity. This DC electricity acts to charge super capacitors 490 so that super capacitors may provide electricity to DC bus 230 for period of time in the event proton exchange membrane portions 480 cease operation. In this manner, PDU 290 will continue to receive power during the time it takes to switch from proton exchange membrane produce power to power provided by panel board 100.

As discussed, the power system described above initially employs photovoltaic arrays to provide electrical power to a number of hydrogen generators. These generators, in combination with a number of storage tanks provide hydrogen for a number of PEMs. The hydrogen generator/proton exchange membrane units are efficient (both in terms of space and fuel), reliable and ecologically friendly. By relying on these units, the system avoids both the reliability problems and environmental hazards inherent in internal combustion generators and the costs and environmental concerns associated with commercial electrical power. The power system also provides redundant sources of power, specifically from a commercial electrical utility and, therefore, is uninterruptible. Finally, the system provides a number of super capacitors to provide electrical power during the time it takes to switch between power sources. By employing super capacitors and proton exchange membranes, the power system avoids the use of batteries thereby saving significant cost and space.

It will be appreciated by persons skilled in the art that the present invention is not limited to what has been particularly shown and described hereinabove. Rather, all matter shown in the accompanying drawings or described hereinabove is to be interpreted as illustrative and not limiting. Accordingly, the scope of the present invention is defined by the appended claims rather than the foregoing description.

What is claimed is:

1. A power supply system for providing reliable electrical power to a telecommunications facility, said facility containing telecommunications equipment, said system comprising:
   at least one hydrogen generator, said generator receiving AC electrical power and producing hydrogen;
   at least one proton exchange membrane, said proton exchange membrane receiving hydrogen at least in part from said hydrogen generator and producing DC electrical power at an output; and
   at least one capacitor coupled to said output of said at least one proton exchange membrane.

2. A system as set forth in claim 1 further comprising at least one photovoltaic cell coupled to an inverter wherein said at least one photovoltaic cell produces DC electrical power and said inverter converts said DC electrical power to AC electrical power which is supplied to said at least one hydrogen generator.

3. A system as set forth in claim 1 wherein said AC electrical power is supplied by a commercial utility.

4. A system as set forth in claim 2 further comprising a switch having a first input coupled to said inverter, a second input coupled to a commercial utility, and an output coupled to said hydrogen generator.

5. A system as set forth in claim 4 wherein the position of said switch is determined by the output level of said at least one photovoltaic cell.

6. A system as set forth in claim 1 further comprising a number of hydrogen storage tanks coupled to both the output of said at least one hydrogen generators and the input of said proton exchange membranes.

7. A system as set forth in claim 1 wherein the output of said at least one proton exchange membrane and a power distribution unit are coupled to a DC bus, said power distribution unit operable to provide power to said telecommunications facility.

8. A system as set forth in claim 1 further comprising a rectifier having an input coupled to commercial electrical power, said rectifier operable to produce DC electrical power on an output, and a switch having an input coupled to said output of said rectifier and an output coupled to said telecommunications facility.

9. A system as set forth in claim 8 wherein the position of said switch is determined by the pressure of said hydrogen provided to said at least one proton exchange membrane.

10. A device for use in a power supply system for providing reliable electrical power to a telecommunications facility, said facility containing telecommunications equipment, said device comprising:
    a hydrogen generator operable to receive AC electrical power and produce hydrogen; and
    a proton exchange membrane operable to convert hydrogen received at least in part from said hydrogen generator into DC electrical power.

* * * * *